United States Patent [19]

Crayford et al.

[11] Patent Number: 5,654,985
[45] Date of Patent: *Aug. 5, 1997

[54] ADDRESS TRACKING OVER REPEATER BASED NETWORKS

[75] Inventors: Ian S. Crayford, San Jose; William Lo, Santa Clara; Nader Vijeh, Sunnyvale, all of Calif.

[73] Assignee: Advanced Micro Devices, Inc., Sunnyvale, Calif.

[*] Notice: The term of this patent shall not extend beyond the expiration date of Pat. No. 5,414,694.

[21] Appl. No.: 653,703

[22] Filed: May 23, 1996

Related U.S. Application Data

[63] Continuation of Ser. No. 198,417, Feb. 22, 1994, abandoned, which is a continuation-in-part of Ser. No. 19,926, Feb. 13, 1993, Pat. No. 5,414,694.

[51] Int. Cl.$^6$ .............. H04B 3/36; H04L 25/20; H04J 3/14; G06F 11/00
[52] U.S. Cl. .............. 375/211; 375/213; 370/246; 370/392; 380/50; 340/825.07; 371/20.2
[58] Field of Search .............. 340/825.34, 825.07, 340/825.06, 825.51, 825.52; 370/94.1, 97, 13.1, 14, 60, 61, 16, 13; 375/211, 214, 213; 371/20.2, 20.4, 25.1, 67.1

[56] References Cited

U.S. PATENT DOCUMENTS

| 4,590,467 | 5/1986 | Lare | 370/94.1 |
|---|---|---|---|
| 5,161,192 | 11/1992 | Carter et al. | 380/48 |
| 5,251,203 | 10/1993 | Thompson | 370/13.1 |
| 5,414,694 | 5/1995 | Crayford et al. | 370/13.1 |

FOREIGN PATENT DOCUMENTS

| 0431751 | 11/1990 | European Pat. Off. . |
|---|---|---|
| 0493892 | 12/1991 | European Pat. Off. . |
| 0517534 | 6/1992 | European Pat. Off. . |

OTHER PUBLICATIONS

Alan Clements, Microprocessor System Design, 1987, pp. 194–198.

IEEE INFOCOM 92', 1992, "Implementation of a Secure Bridge in an Ethernet Environment", F. Recacha, F. Rico and J.L. Melus, pp. 2343–2350.

Primary Examiner—Wellington Chin
Assistant Examiner—William Luther
Attorney, Agent, or Firm—Benman Collins & Sawyer

[57] ABSTRACT

A system is provided for use in a network to provide authentication of packets of data, provide security to ensure the prevention of unauthorized receipt of data, to provide improved monitoring of the packets of data transmitted and received over such a network, and to detect changes in the network topology. Repeaters utilized in the network are provided with the capability to detect and interpret packet data and the source address (SA) and destination address (DA) fields to provide the improved features.

11 Claims, 10 Drawing Sheets

| FIGURE 4A | FIGURE 4B |

FIGURE 4

| FIGURE 8A | FIGURE 8B |

ADDRESS TRACKING OVER REPEATER BASED NETWORKS

This application is a file wrapper continuation of application Ser. No. 08/198,417 filed Feb. 22, 1994, now abandoned which is a continuation-in-part of application Ser. No. 08/019,926 filed Feb. 13, 1993 issued May 9, 1995 as U.S. Pat. No. 5,414,694.

FIELD OF THE INVENTION

The present invention relates generally to address tracking within a local area network and more particularly to address tracking within a network that utilizes Multiport Repeaters.

BACKGROUND OF THE INVENTION

In traditional Ethernet (802.3 10BASE5) and Cheapernet (802.3 10BASE2) a coaxial cable provides the linear bus to which all nodes are connected. Signalling is accomplished using a current synch technique with a center conductor used for the signal and a shield used as a ground reference. Twisted pair Ethernet (802.3 10BASE-T) utilizes standard voice grade telephone cable, employing separate transmit and receive pairs. The system uses a star topology. At the center of a star is a repeater. The repeater performs signal amplitude and timing restoration. It takes the incoming bitstream and repeats it to all the ports connected to it. In this sense the repeater acts as a logical coaxial cable so that any node connected to the network will see another node's transmission. Differential signalling is employed with one pair acting as the transmit path and the other pair acting as the receive path.

While repeaters are used in traditionally wired coaxial Ethernet as a means to extend the networks physical distance limit, in the IEEE 802.3 10BASE-T, the Standard mandates the use of a repeater to actually provide the connectivity function if more than two nodes are required. Although the physical signalling on the cabling differs, the functionality of the repeater is identical in either coaxial or twisted pair networks as is the frame or packet format that is used to pass messages between the participating nodes on the network.

The frame commences with a preamble sequence which is an alternating (1,0) pattern. The preamble provides a single frequency on the network, in this case 5 (Mhz) at the start of each frame, which allows a receiver to lock to the incoming bitstream. This preamble sequence is then followed by a start of packet which indicates that the data portion of the message will follow. Either a start of frame delimiter (802.3) or synch sequence (Ethernet) is used to delineate the start of the data portion of the message. The next two fields are the destination address (DA) and the source address (SA) for the frame. Both are 48 bit values which are transmitted least significant bit (LSB) first.

The destination address is used by the receiving media access controller (MAC) to determine if the incoming packet is addressed to this particular node. If the receiving node detects a match between its own node address and the address within the DA field, it will attempt to receive the packet. Other nodes which did not detect a match will ignore the remainder of the packet.

Three types of destination addressing are supported by these standards.

1. Individual. The DA field contains an individual and unique address assigned to one node on the network.

2. Multicast. If the first bit of the DA field is set this indicates that the group address is being used. The group of nodes that will be addressed is determined by a higher layer function but in general the intent is to transmit a message between logically similar subset of nodes on the network.

3. Broadcast. The broadcast is a special form of multicast address where the DA field is set to all 1s. The address is reserved, and all nodes on the network must be capable of receiving a broadcast message.

The source address field is supplied by the transmitting media access controller (MAC), which inserts it own address into this field as the frame is transmitted indicating it was the originating station. The receiving MAC is not required to take action based on the SA field. The 2-byte length or type field follows the SA field. The choice of length or type is dependent upon whether the frame is compatible with the IEEE 802.3 Ethernet standard. The high order byte of the length type field is transmitted first with the LSB of each byte transmitted first. The data field contains the actual packet data that is being transferred and is between 46 to 1500 bytes in length.

A Logical Link Control (LLC) function is responsible for fragmenting data into block sizes suitable for transmission over the network. Data bytes are transmitted sequentially with the LSB of each byte transmitted first. Finally, the frame check sequence (FCS) is a four-byte field that contains the cyclic redundancy check (CRC) for the entire frame. The CRC is computed by the transmitting station on the destination address, source address, length/type, and data field and appended as the last four bytes of the frame. The same CRC algorithm is used by the receiving station to compute the CRC value for the frame as it is received. The value computed at the receiver is compared with that appended by the transmit station providing an error detection mechanism in the case of corrupted data. The CRC bits within the FCS are transmitted in the order most significant bit to least significant bit.

Figure 1:
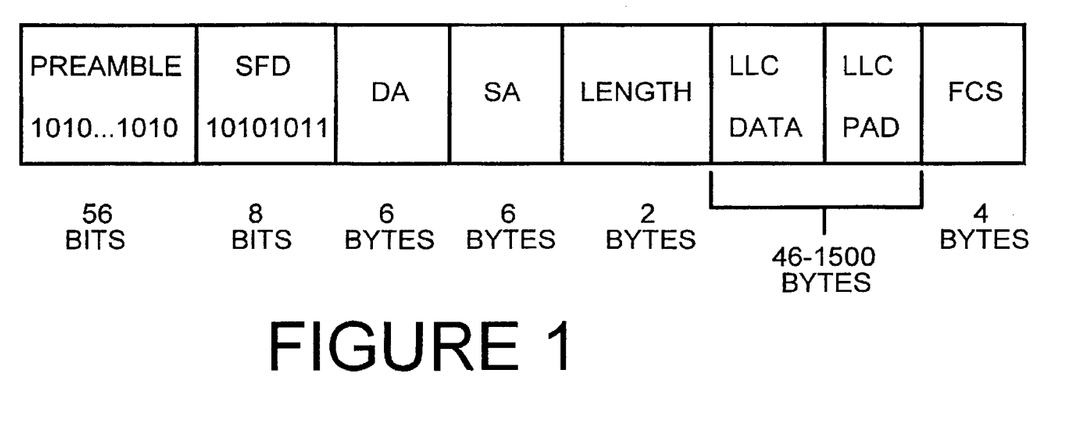
FIG. 1 shows the format for an 802.3 frame.
Figure 2:
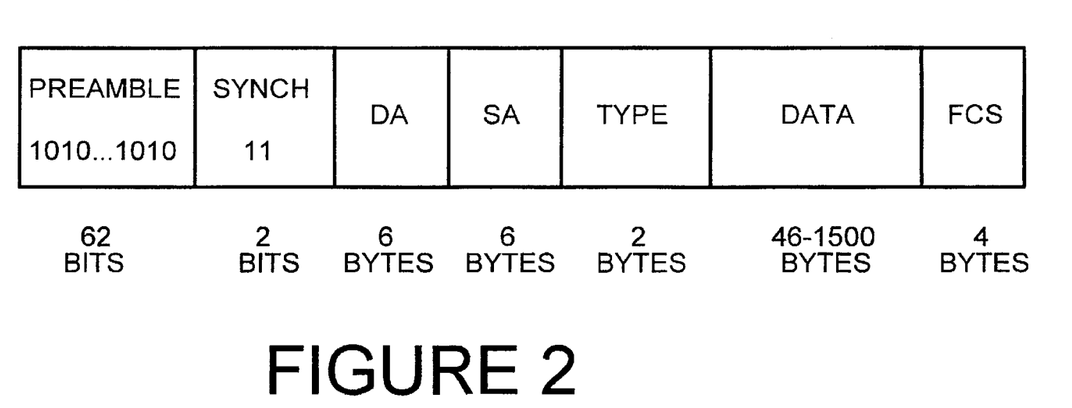
FIG. 2 is a frame format for an Ethernet frame.

Referring now to FIGS. 1 and 2, what is shown is the frame format for an IEEE 802.3 Standard compliant frame and an Ethernet frame, respectively. The primary difference as can be seen from the figures is that the start of frame delimiter (SFD) for 802.3 is defined as a byte that has a "1,0, 1,0, 1,0, 1,1" pattern whereas the start frame (synch) of Ethernet is a "1,1" sequence. However, it is seen in both cases the preamble plus the start of frame indication is a total of 64 bits long.

802.3 and Ethernet standards both specify that a packet must be in the range of 64–1518 bytes. However, the actual data field in the 802.3 system is permitted to be smaller than the 46 byte value that is necessary to ensure this minimum size. This is handled by requiring the media access control layer to append pad characters to the LLC data field before sending data over the network. The Ethernet standard assumes that the upper layer ensures that the minimum data field is 46 bytes before passing data to the MAC and the existence of these appended characters is unknown to the MAC. The 802.3 standard also uses a length field which indicates the number of data bytes that are on the data field only. Ethernet, on the other hand, uses a type field in the same two bytes to identify the message protocol type. Since valid Ethernet type fields are always assigned outside of the valid maximum 802.3 packet length size, both 802.3 and Ethernet packets can coexist on the same network. Hence, it has been found that it is important to be able to track and monitor the addresses for a variety of reasons. For example, for secure networks it may be important that authentication is required to ensure that the appropriate nodes on the network receive the information. In addition, as networks change in the number of nodes attached thereto, it becomes important to be able to associate an address with a particular port or the like within the network.

It is also important in secure networks to prevent a node from receiving such address information.

Finally, it is important to provide a mechanism to associate the addresses of each port of a repeater with the actual port number or identity of the device. Typically, repeaters have been devices that are just used for signal amplitude and timing restoration. In all of the above-mentioned modes the repeater must also be provided with the capability to detect and interpret data and fields within it.

The present invention addresses the need for this type of device.

SUMMARY OF THE INVENTION

The present invention utilizes a system that allows the source address of an incoming packet on a repeater, to be monitored and compared with an internally stored value. The internal value can either be programmed by the user or by simply learning and storing the source address of the previous packet.

In one aspect of the present invention a counter is used to determine the number of times that a source address has changed on the link. In addition, by providing an interrupt, the system informs the host that the source address on the port has changed. Depending on the port type, or source address information, the host can choose to allow the port to continue to operate, or alternatively disable the port from further participation in the network. Notice that a repeater port that is connected to a multidrop network, such as coax Ethernet, may have many stations attached, whereas for a point to point network such as 10BASE-T, the port would typically be connected to a single end station. An exception to this would be a 10BASE-T connection to another repeater.

In yet a second aspect of the invention, receive security or eavesdropping protection is provided by monitoring the destination field upon receiving a message from a port, the destination address field is obtained and compared against the station address that is currently connected to each of the remaining ports of the repeater. The system produces a disrupt mask dependent upon whether the security features are enabled for the port whether there is a destination address/source address match, and whether the packet is a multicast/broadcast. This mask pattern is provided to the repeater, and used to selectively pass the message unmodified or disrupt the message depending upon the pattern.

This system has the advantage that the disrupt mask is actually provided over one serial line rather than over a plurality of serial lines. This disrupt feature can be enabled or disabled on a port by port basis, and it allows for the address comparison and disrupt decision to be made independently on each repeater module since data that passes between modules over the inter-module expansion bus, is unmodified.

A final aspect of the present invention is the ability to quickly monitor, detect and control changes or additions in the network. The present system performs an address comparison on the incoming message using a media access control function. The system then provides an interrupt which indicates the match and further more provides register bits to indicate which port actually received the match. Using this mechanism, a managed repeater can program the desired MAC address into a global source address register, transmit a message on the network to the node, and simply wait for the node to respond. At this point it can be determined which port that the specific address is connected to. If no response is received, then the external host can time out the wait period and move to locating another address.

DETAILED DESCRIPTION OF THE INVENTION

The present invention is directed toward a system for tracking node addresses connected to repeater ports. The following description is presented to enable one of ordinary skill in the art to make and use the invention and is provided in the context of a patent application and its requirements. Various modifications to the preferred embodiment will be readily apparent to those skilled in the art and the generic principles and features described herein.

The system that is utilized to provide the various functions will be described in detail hereinafter with reference to the different functions.

The system as described allows the source address of an incoming packet to be monitored and compared with an internally stored value. The internal value is either programmed by the user through a microprocessor interface or by simply learning and storing the source address of the previous packet. The present invention takes to advantage that the last source address indicates the source address of the last packet received on the port. If the source address changes, this indicates the sending station connected to the port either changed or that multiple nodes are connected to that port. A counter can be maintained to indicate the number of times that the source address has changed on the port. Hence, there will be an increment to one after power up assuming that the source address does not match a previously stored or expected value. For a multi-drop segment, the source address may change many times as different stations transmit over the network. Hence, this counter can be used to provide an indication of which type of network medium or configuration this port is likely to be connected to, or whether the source address field has changed even though this was not expected.

For example, the source address could have changed because someone is trying to gain unauthorized access to the network. Consequently, the present invention provides an interrupt that informs the host processor that the source address on the port has changed. The host can then, dependent upon the port type, or other decision making criteria available to it, choose to allow the port to continue to operate or alternatively disable the port from further participation in the network.

Figure 3:
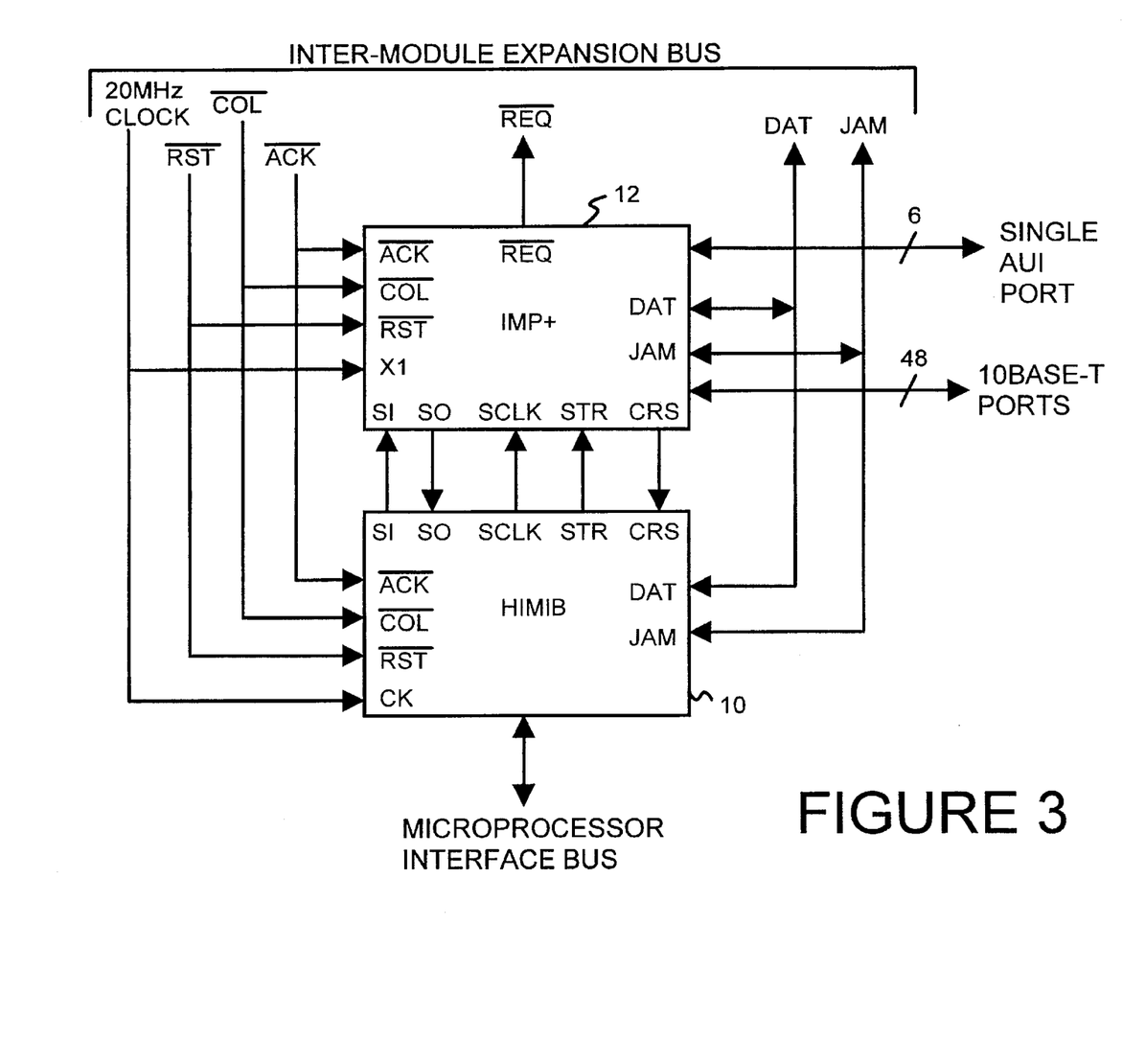
FIG. 3 is a simplified block diagram of an Integrated Multiport Repeater and a Hardware Implemented Management Information Base Device in accordance with the present invention.

Referring now to FIG. 3, the present invention comprises two devices in a preferred embodiment. One is entitled The Hardware Implemented Management Information Base (HIMIB) Device 10 and the other is an Integrated Multiport Repeater (IMR+) device 12. The IMR+ device provides the basic repeater function, performing signal amplitude and timing restoration, incorporating 8 individual 10BASE-T ports, and one Attachment Unit Interface (AUI) port. The AUI port allows connection of the 10BASE-T ports to an existing coaxial wired Ethernet/Cheapernet network. The IMR+ device also provides an inter-module expansion bus 11, which allows multiple IMR+ devices to be cascaded together, and still be treated as a single repeater.

Continuing Data

The inter-module expansion bus 11 comprises the signals RST (Reset), 20 MHz clk (20 MHz clock), REQ (Request), ACK (Acknowledge), COL (Collision), DAT (Data) and JAM (Jam). The operation of this type of expansion scheme is described in U.S. Ser. No. 07/556,046, entitled Expandable Repeater and assigned to the assignee of the present application.

Note that the data passed across this expansion bus on the DAT line, is a restored version of the incoming packet data received when a single part of the IMR+ device (or group of devices) is active. This means that the preamble field of the packet which is passed across the DAT pin is restored, substantially reducing or eliminating preamble shrinkage effects due to the start up delays of the receive circuits.

In addition, the IMR+ device also has a management port, to allow configuration and monitoring of the operational state of the repeater, and a simple reporting function to provide an external indication of which port is receiving at any time.

The HIMIB device is a companion device to the IMR+ circuit, and provides monitoring for all network activity detected by the IMR+ device. The HIMIB collects statistics based on the type of network activity, and stores this information internally as registers which can be accessed by an external host device, such as a microprocessor. The host typically uses the data collected and stored by the HIMIB device to provide network management information, in order to more easily administer the operation and/or fault diagnosis of the network.

These two devices 10 and 12 cooperate to provide the advantages above described. To more fully understand the operation of these two devices, refer now to the following discussion.

HIMIB 10
Storage of Source Address

Figure 4:
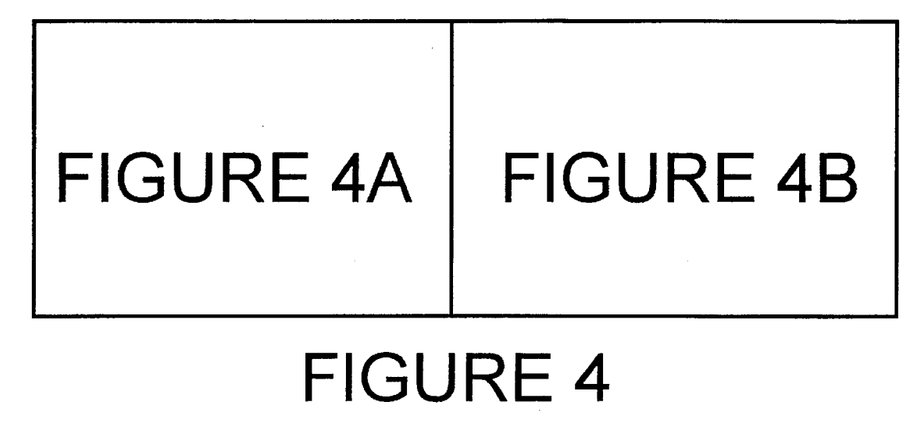
FIG. 4 is a destination address compare circuit.
Figure 4A:
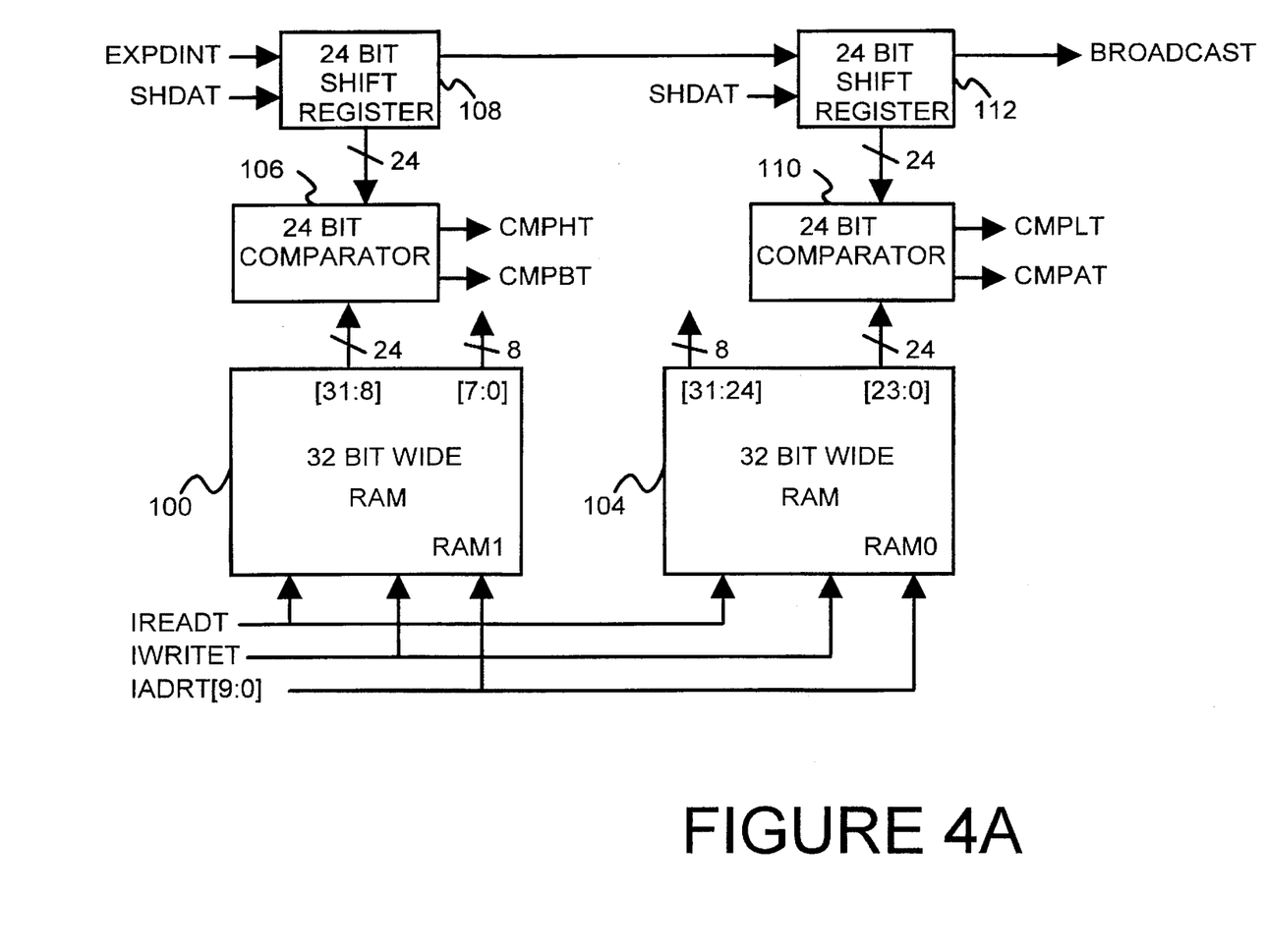
Figure 4B:
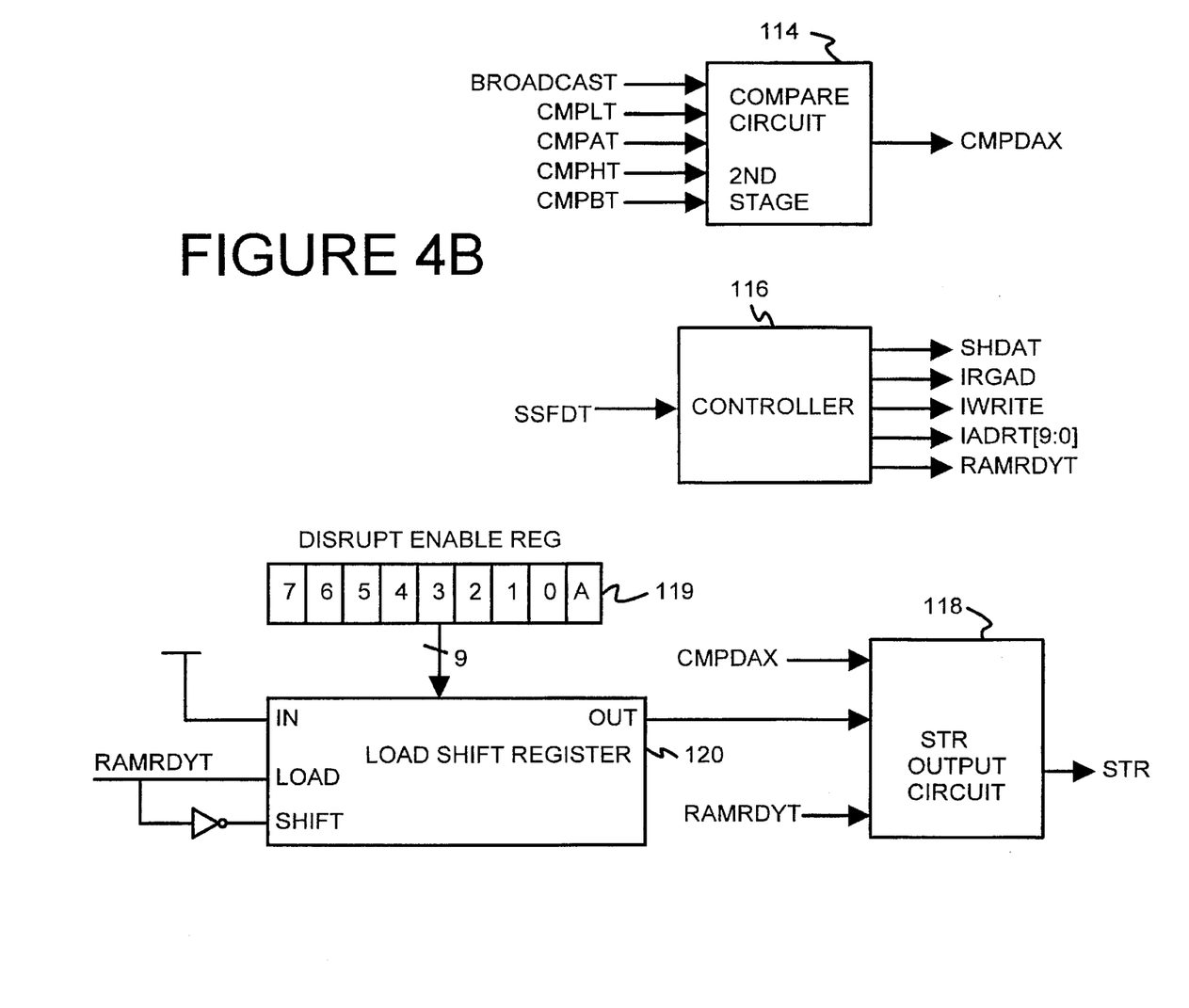

FIG. 4 is a block diagram of destination address DA compare circuit in the HIMIB device 10. The circuit 10 comprises random access memories (RAM) 102 and 104, which are coupled to comparators 106 and 110 respectively. In this embodiment the RAMs 102 and 104 are 32 bit wide memories and the comparators 106 and 110 are 24 bit wide comparators. The comparators 106 and 110 in turn are coupled to shift registers 108 and 112 respectively. These shift registers 108 and 112 in this embodiment are 24 bit shift registers. The sizes of the various devices are arbitrary and one of ordinary skill in the art will recognize that many other combinations could be used and still be within the spirit and scope of the present invention.

The output from circuits 106 and 110 are provided to a second stage compare circuit 114. A controller 116 is also included which receives input signals and provides a plurality of outputs to the various portions of circuit 10. The controller 116 also provides signals to a shift register 120 which in combination with signals from the second stage compare circuit 114 and the controller controls strobe STR output circuit 118.

The 32 bit wide RAMs 102 and 104 hold the values of the managed repeater attributes. With the exception of the Source Address attribute (SA) each RAM location holds one attribute. Since the SA for each port is 48 bits wide, the SA is split into two RAM locations—the lower 24 bits of the SA is stored in the lower 24 bits in RAM 104, the upper 24 bits of the SA is stored in the upper 24 bits in RAM 102. The upper 8 bits of RAM 104 and the lower 8 bits of RAM 102 holding the SAs are not used. The reason that the SA is stored across two RAMs is that the full 48 bits can be accessed at the same time.

The values written into the SA locations are either written in through the microprocessor interface (MPI) by the user, or automatically updated when a valid frame is received. In the latter case, the source address of the frame is written into the corresponding SA location for the specific repeater port in the RAM.

Storage of Destination Address

When a packet is detected the controller 116 enables both 24 bit shift registers to shift in the incoming packet by asserting SHDAT. The two 24 bit shift registers combine to make a 48 bit shift register. The packet data comes in on EXPDINT. EXPDINT is the packet data being received by a single active port on an IMR+, and driven onto the DAT pin of the expansion bus.

Once the controller 116 circuit detects a start of frame delimiter (SSFDT) in the packet, it counts off 48 bit times to allow the Destination Address (DA) to be shifted into the shift registers. Once the DA is loaded, the controller 116 de-asserts SHDAT. The first bit received is considered to be the LSB.

Note that for the IMR+ 12 and HIMIB 10 pair that detect an active network port, the IMR+ 12 will drive out the unmodified packet data on the DAT pin (with the exception that the preamble field will be restored as close to its original intended length as possible), and the associated HIMIB 10 will commence looking for the start frame delimeter, to determine where the DA field starts.

Continuing Data

Other IMR+/HIMIB device pairs, located on the expansion bus, will also receive the unmodified packet data on the DAT pin. These 'demonstration' devices will in the case of the IMR+, repeat the packet data from the DAT pin onto their network ports, as a normal repeater function. In the case of the 'downstream' HIMIB devices, these will also receive the unmodified packet data from DAT, and also commence looking for the start frame delimeter.

In this way, an expandable repeater can be constructed, consisting of multiple IMR+/HIMIB pairs connected via the expansion bus. All interconnected HIMIB devices 10 simultaneously look for and detect the start frame delimiter, and then subsequently capture the first 48 bits in the packet as the DA field.

Comparing SA Against DA

In each HIMIB device 10, once the DA is loaded, the control logic compares the SA against the DA by asserting IREADT and IADRT[9:0]. Nine compares are done. The first compares attachment unit interface (AUI) SA against DA, the second compares twisted pair (TP) O SA against DA; . . . , the ninth compares TP 7 SA against DA. Each compare is completed in one bit time.

For each compare a partial compare is done by the two 24 bit comparators 106 and 110, and the partial results are output on CMPLT, CMPAT, CMPHT, CMPBT. The 24 bit comparators 106 and 110 compares the value from the RAMs 102 and 104 (the SA) against the value in the 24 bit shift registers 108 and 112 (the DA). The controller 116 cycles through the addresses of the 9 SAs (one for each port) by asserting the correct addresses on the address bus of the RAMs 102 and 104 (IADRT[9:0]) to select the stored SA for each port, in the order AUI, TP 0, . . . , TP 7.

The partial compare results are combined in the second stage compare circuit 114. The reason that this is done is to decrease the circuit delays of the compare circuit. The SA against DA compare result is gated by the BROADCAST signal which is the LSB of the DA (that is if the LSB of the DA=1, the DA is a broadcast or multicast address). If SA=DA or the DA is a broadcast/multicast address, the output of the compare circuit (CMPDAX) is set to equal, otherwise, the compare is considered to be unequal.

By cycling through the SAs in the RAM, CMPDAX will output a serial bitstream with 1 bit per port, indicating whether the addresses are equal or not.

Enabling the Disrupt Function

For each HIMIB device, the disrupt function must be enabled explicitly for each port (that is a port will not be disrupted even if the port SA does not match the packet DA with the disrupt function disabled). Upon reset, each HIMIB sets the Disrupt Enable Register to disable for all ports. Each port can be enabled individually by writing the appropriate commands via the MPI.

Disrupt the Bitstream on STR Pin

The format of the disrupt bitstream is as follows: . . . HHHHLA01234567HHHHHHHHH . . . H=high, L=low, A=AUI, 0–7=TP 0–7. The disrupt bit stream is output from each HIMIB device 10 on the STR pin, to its associated (partner) IMR+ device 12.

Normally, the STR pin is held high. The sequence begins with a low (start bit) followed by 9 bits indicating whether a port should be disrupted. (0=disrupt, 1=no disrupt). The IMR+ 12 requires 9 stop bits (high) before another disrupt command can be issued, but the HIMIB 10 issues at most one disrupt command per packet.

Normally, RAMRDYT is asserted which indicates to the 9 bit parallel load shift register 120 to load the value from the 9 bit Disrupt Enable Register 119. Once the SA versus DA comparison begins, RAMRDYT is de-asserted and the 9 bit shift register stops loading and starts shifting out the disrupt enable bits (AUI, TP 0, . . . , TP 7). The shifting of the 9 bit shift register coincides with the bitstream of CMPDAX from the compare circuit.

When RAMRDYT transitions from asserted to de-asserted, the STR output circuit outputs a start bit (low) on the STR pin. During the next 9 bit times if the output of the 9 bit shift register 120 indicates enable and CMPDAX from 114 indicates unequal, a disrupt bit (low) will be output on the STR pin from 118, otherwise a no-disrupt (high) will be output.

Note again that each HIMIB device 10 interconnected via the expansion bus completes the address compare and output of the disrupt bit stream to its partner IMR+ device 12 in parallel, each acting on the unmodified packet data that is repeated on the DAT pin, by the IMR+ device 12 with an active receive port.

Address Tracking and Discovery Mechanism

Figure 8:
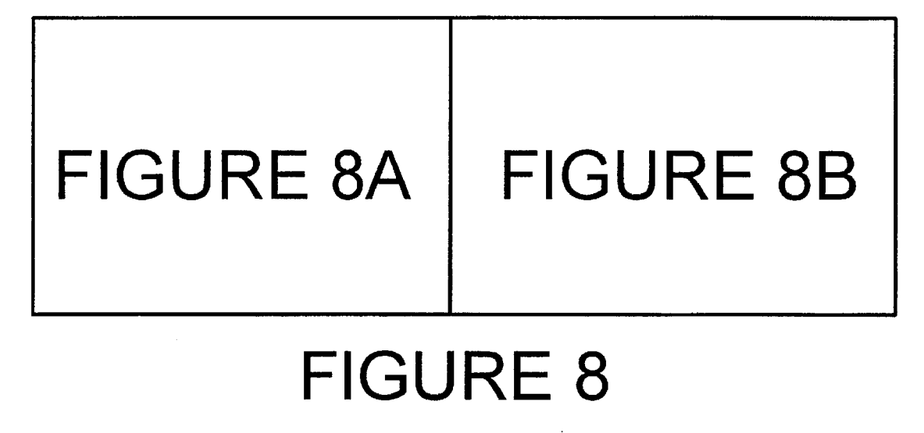
FIG. 8 is one embodiment of an address tracking circuit.
Figure 8A:
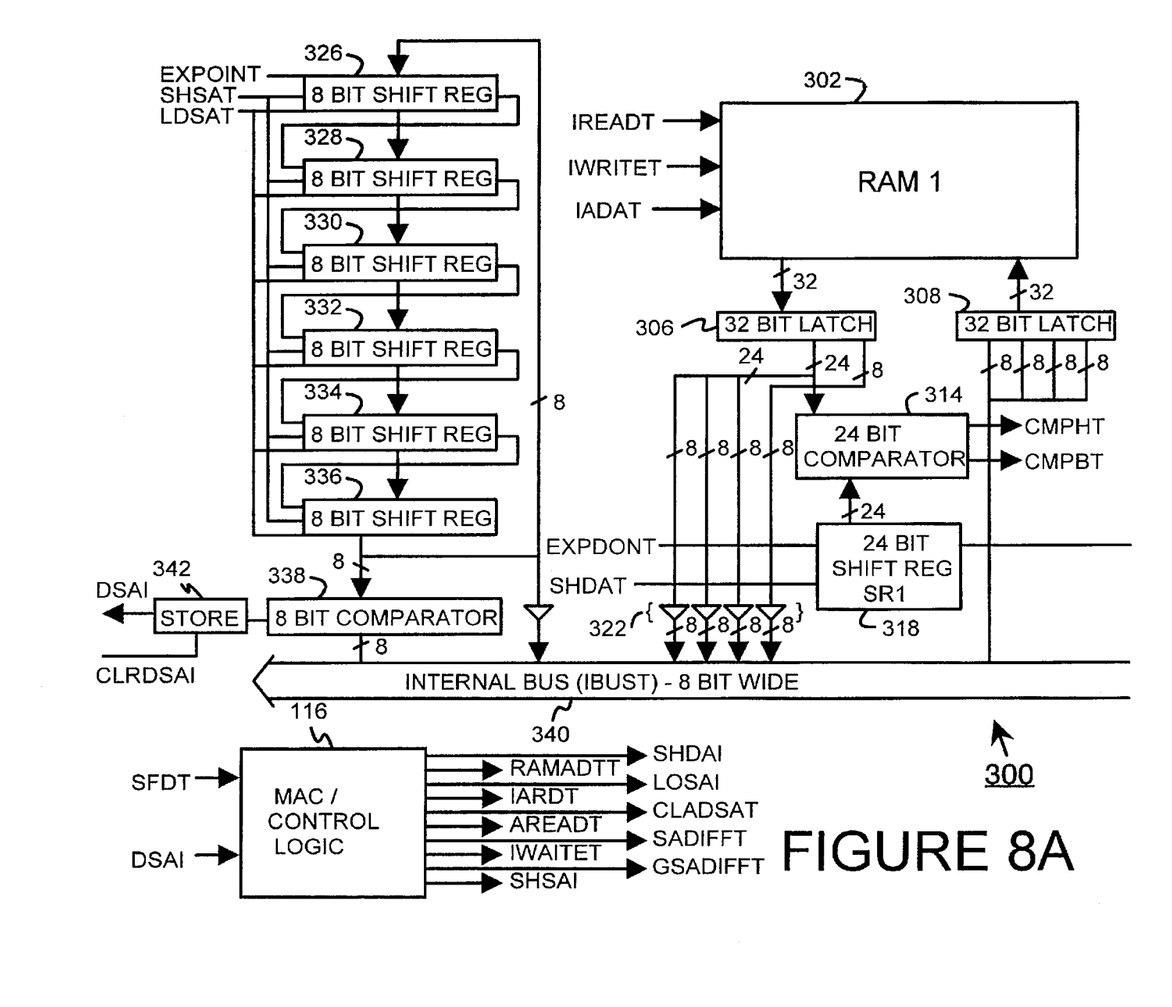
Figure 8B:
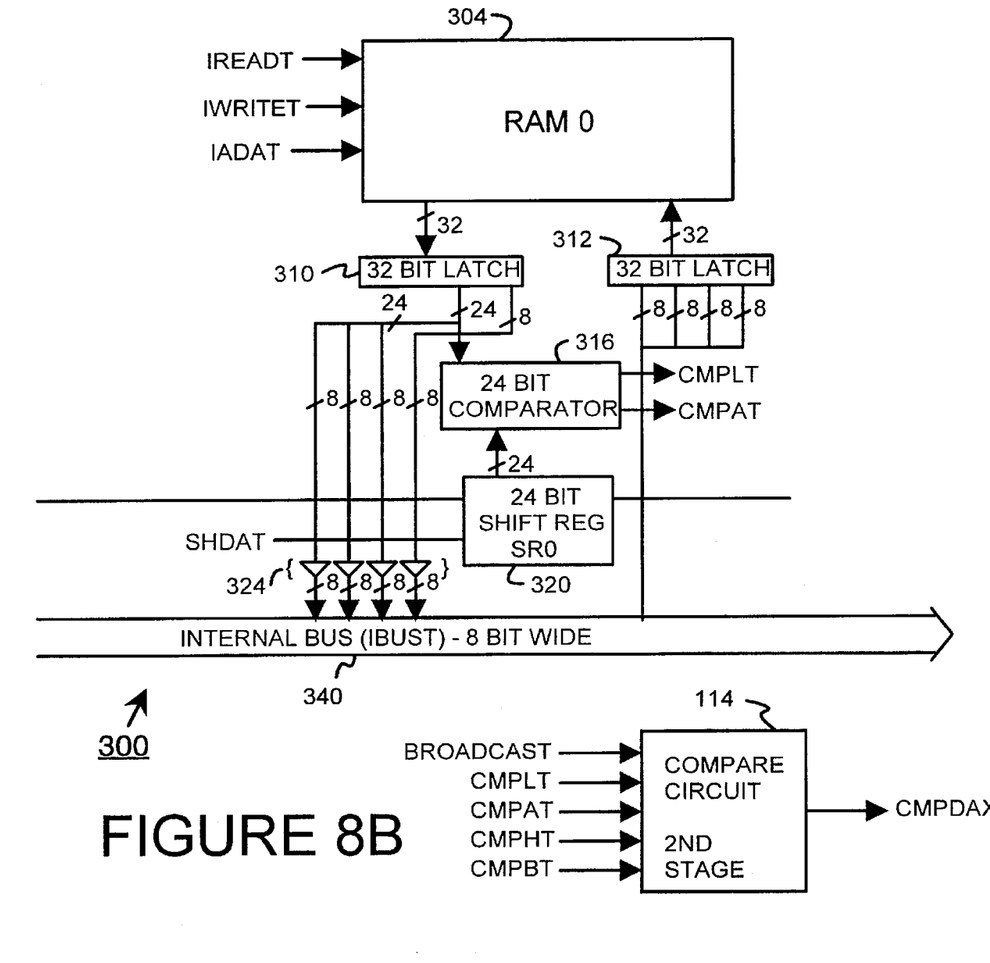

FIG. 8 shows a first embodiment of a block diagram for an address tracking circuit 300 within the HIMIB 12.

The circuit 300 comprises RAM 302 and 304, each of RAMs are coupled to two 32 bit latches 306, 308, 310 and 312 respectively. Latch 306 is coupled to a 24 bit comparator 314. Latch 310 is coupled to a 24 bit comparator 316. Comparator 314 is coupled to 24 bit shift register 318. Comparator 316 is coupled to 24 bit shift register 320. The latch 306 also is connected to 4 tristate buffers 322. The latch 310 is coupled to 4 tristate buffers 324. There are six serially connected 8-bit shift registers 326, 328, 330, 332, 334 and 336 which receive data from the controller 116. A comparator 338 compares the output of shift register 336 with a signal from the internal bus (IBUST) 340. The comparator 338 provides an output to a store circuit 342.

When the HIMIB 12 detects packet activity, it will assert LDSAT to shift the packet data through the six 8 bit shift registers 326–336. These shift registers 326–336 are connected to form a 48 bit shift register. The data in the shift register can also be shifted in parallel 8 bits at a time by asserting SHSAT. After the start of frame delimiter (SFD) is detected in the packet, SSFDT will be asserted and the control circuit 116 will then de-assert LDSAT 96 bit times after the assertion of SFDT. This will stop the loading of the 8 bit shift registers so that the source address of the packet is held in the shift registers. (The SA is the 49 to 96th bit after the SFD).

The MAC address is stored in the RAMs 302 and 304. RAM 302 contains the upper 3 bytes of the MAC address, and RAM 304 contains the lower 3 bytes. The MAC address is programmed into the RAM by the user via the microprocessor interface (MPI).

The controller 116 reads the RAMs 302 and 304 and places the MAC address on the internal bus 340 one byte at a time. All 48 bits of the MAC address are latched by both 32 bit latches 306 and 310 (only 24 out of 32 bits are used for the MAC address) at the same time. Each byte of the source address is placed on the internal bus 340 by enabling the corresponding tristate buffer 322 and 324.

At the same time that the MAC address is placed on the internal bus 340, the controller 116 asserts SHSAT to shift the source address out 8 bits at a time into the comparator 338. Note that after 6 shifts, the source address reverted back to its previous order.

The addresses are compared one byte at a time in comparator 338. The byte compare results are stored in the store block 342. The final result of the compare is output on DSAT (DSAT is asserted to indicate "no match"). Note that the controller 116 asserts CLRDSAT prior to an address compare to clear the result from a previous address compare. When the controller 116 detects that DSAT is not asserted after a MAC to source address compare, GSADIFF is asserted to indicate that a MAC address match occurred.

GSADIFF is used by additional logic to both generate an interrupt externally, to signify the match condition, and to latch the identity of the active receive port on which the packet was received. In this way, a MAC address programmed into the appropriate HIMIB register will cause an interrupt, and the identity of the port on which the packet with that MAC address was received from.

In addition to comparing the source address against the MAC address, the HIMIB 10 also compares the source address with the previous source address of the active port. The mechanism for performing this compare is identical to the MAC address compare with the following exceptions.

1. The control logic will assert IADRT to point to the location in the RAMs that contains the previous source address instead of the MAC address.

2. When the control logic detects that DSAT is asserted after a previous stored source address is compared to the new source address in 326–336, SADIFF is asserted to indicate that a SA change occurred.

The new source address can be written into the RAMs by transferring the address 1 byte at a time from the 8 bit shift registers via the IBUST 340 into the 32 bit latches. The source address is the written into the RAMs from the 32 bit latches.

The previous description of the address tracking circuit 300 is not the most efficient way to implement the address comparison given that the destination address comparison is done differently. However, the reason that the address comparisons are done differently is:

The disrupt command to the IMR+ must be sent as soon as possible, thus each address comparison must be completed in one cycle rather than six.

A preferred method of performing the MAC and previous source address comparisons is to compare them in the same way as the destination address comparison as shown in FIG. 4. However, the following modifications to the circuit have to be made.

1. The 24 bit shift registers 108 (318) and 112 (320) would be separated so that each can load independently.
2. The second stage compare circuit would have registers to hold the partial compare results from 108 (318) for all ports. Note that the fact that the address is a broadcast address should also be stored.

The sequencing of address compares is as follows:
First 24 bits of frame.
   Load shift register 112 (320) with lower 3 bytes of DA.
Second 24 bits of frame.
   Load shift register 108 (318) with upper 3 bytes of DA.
   Compare 24 bit value in shift register 112 (320) against the lower 3 bytes of the address stored in RAM 104 (304) for all ports. (In the case of the IMR+ and HIMIB 9 address compares are performed on the 8 TP ports and 1 AUI port). The results of the compares are stored in the second stage compare circuit. The broadcast address bit should also be stored.
Third 24 bits of frame.
   Load shift register 112 (320) with lower 3 bytes of SA.
   Compare 24 bit value in shift register 108 (308) against the upper 3 bytes of the address stored in RAM 102 (302) for all ports and combine the results with the stored results from the compare done previously with shift register 112 (320). Output the final compare results on CMPDAX. These compares are used to generate the disrupt bitstream to the IMR+ 12.
Fourth 24 bit of frame.
   Load shift register 108 (318) with upper 3 bytes of SA.
After the fourth 24 bit of frame.
   Compare previous source address with current source address.
   Compare previous source address with MAC address. Overwrite previous SA with new SA if necessary. (Store value in shift registers 108 (318) and 112 (320), into RAMs 102 (302) and 104 (304).)

IMR+ 12 Enabling the Disrupt Function

The disrupt function is enabled on the IMR+ 12 when the appropriate management command is sent to the IMR+ 12. The management command is typically sent by the HIMIB 10 during the initialization sequence. Within several bit times after the disrupt function is enabled, the IMR+ 12 STR pin becomes an input.

Loading the Disrupt Bitstream

Figure 5:
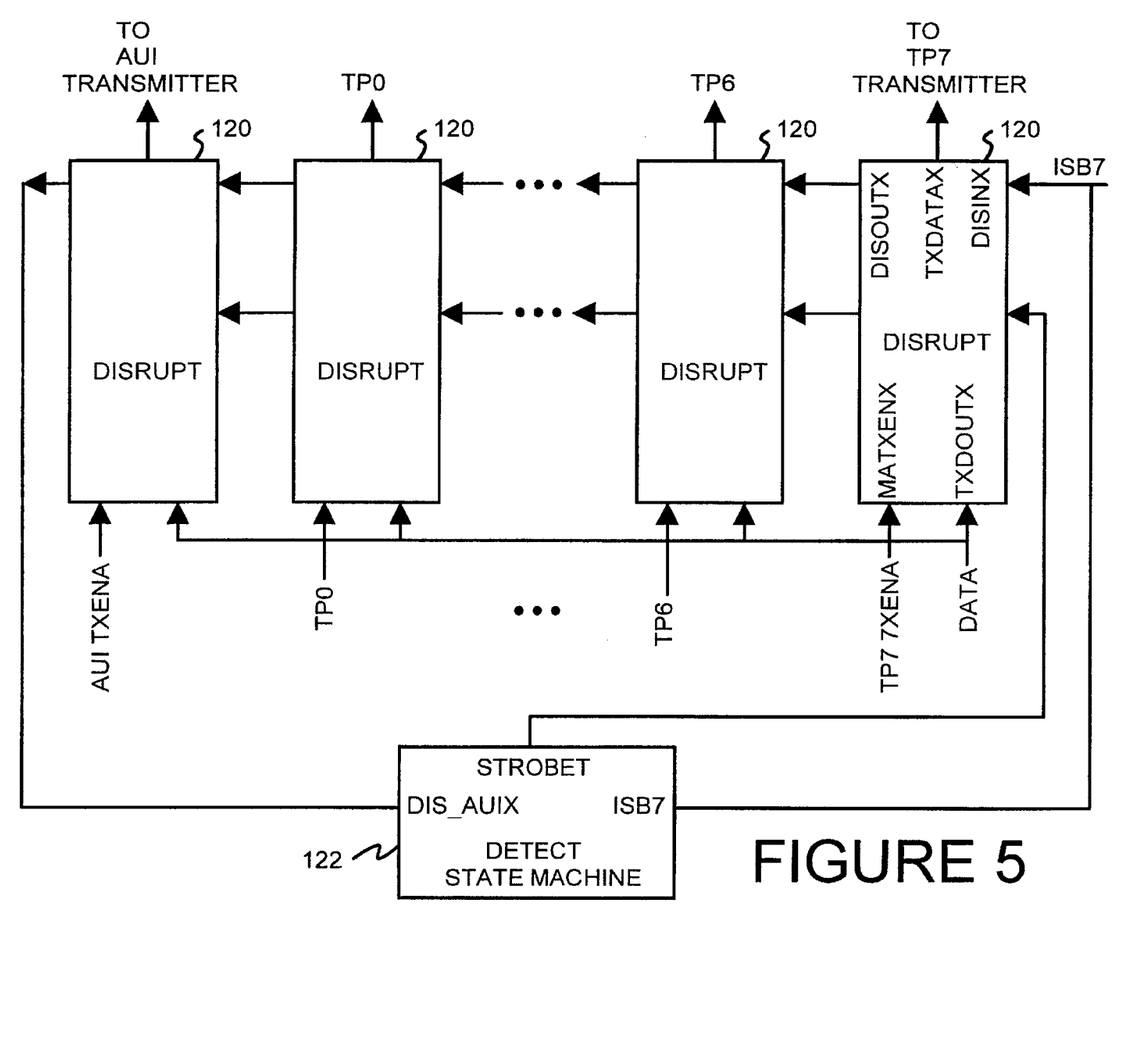
FIG. 5 is an overall block diagram of the IMR+ disrupt function.
Figure 6:
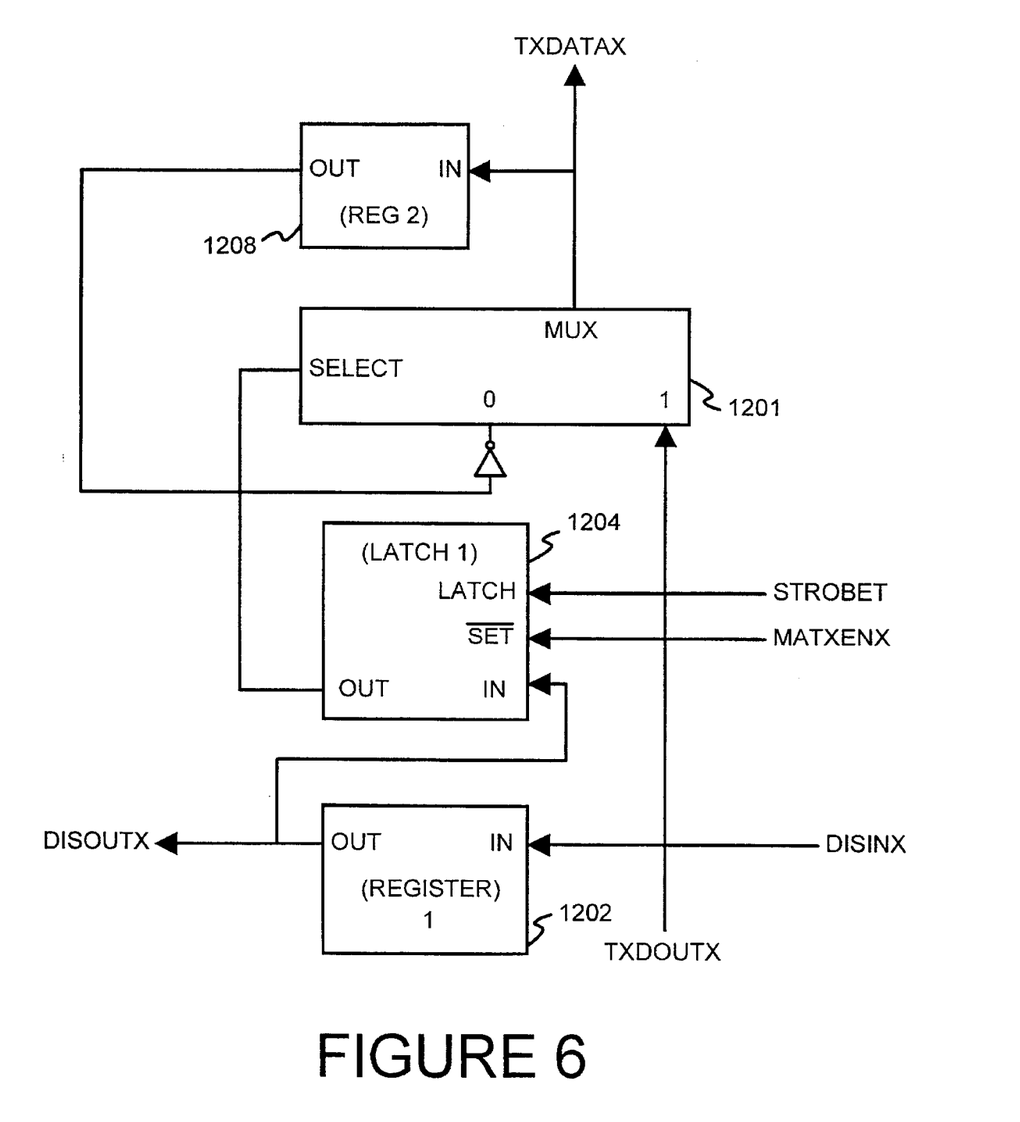
FIG. 6 is a more detailed block diagram of the IMR+ disrupt circuitry.

FIG. 5 is a block diagram of the IMR+ disrupt circuit 12. In this embodiment are nine copies of the disrupt circuit 120 which are coupled in a serial manner and there is disrupt detect state machine 122 coupled in feedback relation with the state machine. There is one disrupt circuit 120 for each port in the IMR+. FIG. 6 is a block diagram of one disrupt circuit 120 of the IMR+ circuit 12 of FIG. 5.

Inside each DISRUPT block there is a 1 bit shift register 1202 (FIG. 6). The 1 bit shift registers 1202 are chained across the DISRUPT circuits 120 to form a nine bit shift register. All bits from the STR pin (ISTB) are shifted through the 9 bit shift register. The output of the shift register is DIS_AUIX. The shift register is normally filled with 1s (since the STR pin is normally held high).

Figure 7:
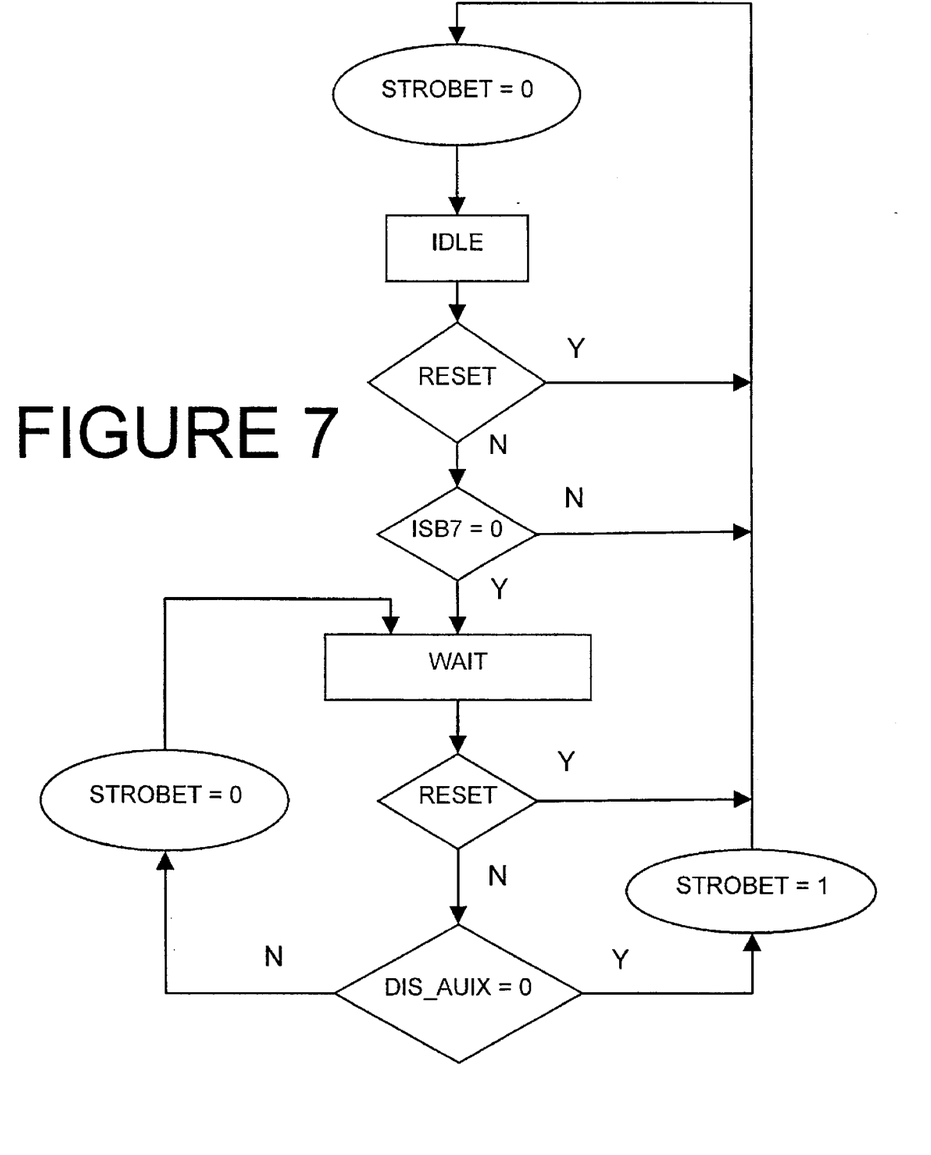
FIG. 7 is a flow chart showing the disrupt command detect state machine.

The bits from the STR pin also goes into the DETECT circuit 122, which contains a state machine which looks for the start bit (low). The operation of the state machine is shown in a flow chart in FIG. 7. Once a start bit is detected, the state machine enters a wait state and waits for the start bit to propagate through the 9 bit shift register (DIS_AUIX). Once the start bit propagates through the shift register, the state machine asserts (STROBET) for 1 bit time and exits back into the idle state.

Referring now to FIG. 6, when STROBET is asserted, the data in each of the 1 bit shift register 1202 (REG 1) in the DISRUPT block is latched into LATCH 1204. LATCH 1204 is normally set. LATCH 1204 can only be cleared if a disrupt bit is strobed in.

Disrupting A Port

LATCH 1204 is set whenever MATXENX is de-asserted. MATXENX is asserted when the port is transmitting, otherwise it is de-asserted. When LATCH 1204 is in the set state data on TXDOUTX passes through the DISRUPT circuit 1204 via TXDATAX unaltered. When LATCH 1204 is in the clear state, data on TXDOUTX is blocked and TXDATAT will pass alternating 1s and 0s (jam sequence). Note that at the end of transmission, MATXENX will be de-asserted and LATCH 1204 will be set.

Although the present invention has been described in accordance with the embodiments shown in the figures, one of ordinary skill in the art recognizes there could be variations to the embodiments and those variations would be within the spirit and scope of the present invention. Accordingly, many modifications may be made by one of ordinary skills in the art without departing from the spirit and scope of present invention, the scope of which is defined solely by the appended claims.

The invention claimed is:

1. A repeater including a plurality of ports that receives and transmits a plurality of packets of data, each one of the plurality of packets including a source address (SA) field and a destination address (DA) field, the repeater including a plurality of repeater circuits, the repeater comprising:
   a bus for interconnecting the plurality of repeater circuits, at least one of the repeater circuits including a system for the tracking a validating source addresses (SAs) coupled to the plurality of ports, the system further comprising: means for storing a value representation of a SA field; means for receiving a packet and extracting a value representation of the SA field from the received packet; and means coupled to the means for storing and to the means for receiving for comparing the extracted SA value representation to the stored SA value representation, wherein a signal is provided responsive to the comparison indicating a match or mismatch, the signal further indicating the port coupled to the extracted SA value representation for which there was a match or mismatch.

2. The repeater of claim 1 wherein data transmitted by the bus is not disrupted by the plurality of repeater circuits.

3. The repeater of claim 1 in which the means for storing comprises a plurality of random access memories (RAMs).

4. The repeater of claim 3 in which each of the plurality of random access memories is 32 bits wide.

5. The repeater of claim 1 in which the stored value representation of the SA field is written into memory through an external interface.

6. The repeater of claim 1 in which the stored value representation of the SA field is automatically updated when a valid frame is received.

7. A repeater, including a plurality of ports, that receives and transmits a plurality of packets of data, each one of the plurality of packets including a source address (SA) field and a destination address (DA) field, the repeater including a plurality of repeater circuits, the repeater comprising:

a bus for interconnecting the plurality of repeater circuits, at least one of the repeater circuits including a system for tracking Destination Addresses (DAs) coupled to the plurality of ports, the system further comprising: means for receiving a DA field; means for storing a plurality of address representing ports coupled to the repeater; means coupled to the means for storing and the means for receiving for comparing the DA field to the plurality of addresses; and means for disrupting the packet if there is not a match, the means for disrupting the packet further comprising means for disrupting the packet on a port coupled to the DA field which does not match one of the plurality of addresses.

8. The repeater of claim 7 wherein data transmitted by the bus is not disrupted by the plurality of repeater circuits.

9. The repeater of claim 7 which includes means coupled to the disrupting means for preventing the disrupting of a packet when the packet is a multicast or broadcast format.

10. A repeater, including a plurality of ports, each one of the plurality of ports having a port address, that receives and transmits a plurality of packets of data, each one of the plurality of packets including a source address field and a destination address field, the repeater also including a plurality of repeater circuits, the repeater comprising:

a bus for interconnecting the plurality of repeater circuits, at least one of the repeater circuits further including a system coupled to the plurality of ports for tracking an validating source addresses, the system further comprising: means for storing a port address into the system; means for receiving a source address representing an incoming packet from a port; means coupled to the means for storing and means for receiving for comparing the stored port addresses with the source addresses representing an incoming packet; means coupled to the means for comparing for providing an interrupt signal indicating a match between the stored port address and the incoming source address; and means coupled to the means for comparing for providing the identity of the port on which the match occurred.

11. The repeater of claim 10 wherein data transmitted by the bus is not disrupted by the plurality of repeater circuits.

* * * * *